(12) United States Patent
Slayden

(10) Patent No.: US 6,206,446 B1
(45) Date of Patent: Mar. 27, 2001

(54) ATV ALL-WEATHER CAB

(76) Inventor: Jerry K. Slayden, 201 S. Central, Wood River, IL (US) 62095

( * ) Notice: Subject to any disclaimer, the term of this patent is extended or adjusted under 35 U.S.C. 154(b) by 0 days.

(21) Appl. No.: 09/270,244

(22) Filed: Mar. 15, 1999

(51) Int. Cl.[7] .................................................. B60J 1/00
(52) U.S. Cl. ......................................... 296/77.1; 296/102
(58) Field of Search ................................. 296/24.1, 35.3, 296/77.1, 78.1, 102, 190.08, 190.1, 190.11, 200, 206

(56) References Cited

U.S. PATENT DOCUMENTS

| | | | |
|---|---|---|---|
| D. 274,063 | 5/1984 | Skaff et al. ........................... | D15/30 |
| 4,135,757 | 1/1979 | Smith et al. ........................ | 296/35 R |
| 4,433,868 | 2/1984 | Hochwitz et al. .................... | 296/190 |
| 4,739,853 | 4/1988 | Ogilvie .............................. | 180/89.12 |
| 4,773,694 * | 9/1988 | Gerber ................................ | 296/77.1 |
| 4,950,017 * | 8/1990 | Norton ................................ | 296/77.1 |
| 4,973,082 * | 11/1990 | Kincheloe .......................... | 280/756 |
| 5,174,622 * | 12/1992 | Gutta .................................. | 296/77.1 |
| 5,203,601 * | 4/1993 | Guillot ............................... | 296/77.1 |
| 5,217,275 * | 6/1993 | Ridge ................................. | 296/77.1 |
| 5,509,717 * | 4/1996 | Martin ................................ | 296/77.1 |
| 5,588,690 * | 12/1996 | Showalter .......................... | 296/77.1 |
| 5,961,175 * | 10/1999 | Clardy, Jr. .......................... | 296/102 |

\* cited by examiner

*Primary Examiner*—Dennis H. Pedder
*Assistant Examiner*—Jason Morrow
(74) *Attorney, Agent, or Firm*—Don W. Weber

(57) ABSTRACT

A cab enclosure for an ATV vehicle is presented. The cab enclosure is made of clear polycarbonate sheets. A lower main frame is rectangular and is bolted onto the front and rear luggage racks of an ATV vehicle. The cab has a clear top, sides, front windshield and rear window so that the operator has an unobstructed field of vision. The cab's lower sides extend to the floor boards. A flexible vinyl flap is attached inside the cab to the front and rear cargo areas of the unit. The flaps are also attached to the rear fenders and snugly fit around the seat, hood, and other areas of the vehicle. The cab provides a virtually unobstructed view to the operator, but also keeps out the rain or snow as well as helping to heat the vehicle by retaining the heat generated by the motor. The cab is easily removed by unfastening the securing bolts and lifting the cab from the ATV vehicle.

1 Claim, 4 Drawing Sheets

ATV ALL-WEATHER CAB

BACKGROUND OF THE INVENTION

This invention relates to an all-weather cab for a vehicle. More particularly, an all-weather cab for an all terrain vehicle or similar device is presented.

All terrain vehicles (ATVs) are in common use throughout the United States. These vehicles are small, highly mobile vehicles usually having four wheels. These vehicles are able to traverse all terrains, including roadways, countryside, hills and even mountain pathways. On occasions, these vehicles are used in inclement weather. However, no device has yet been introduced which allows a level of comfort while operating the device in inclement weather conditions.

Cabs for certain vehicles are common throughout various industries. However, the ATV industry has not yet developed such a device for use during rain, cold, sleet or snowing conditions.

Tractors are used commonly throughout the world and often must be used during inclement weather conditions. Tractor cabs with various improvements have been known in the prior art for many years. For example, the 1979 patent issued to Smith (U.S. Pat. No. 4,135,757) discloses a tractor cab and safety frame mounting for attaching a cab to a tractor. Hochwitz disclosed a cab for a walk behind tractor in his 1984 patent (U.S. Pat. No. 4,433,868). A ventilated tractor cab was disclosed by Ogilvie in 1988 (U.S. Pat. No. 4,739,853). The Ogilvie cab is for a medium size farm tractor and had the additional improvement of being pivotably attached to the chassis of a tractor for pivotable motion between a raised and a lowered position. A yard tractor cab design was disclosed by Skaff in 1984. Skaff's patent (U.S. Pat. No. D274,063) involved the design of a cab placed over a yard tractor.

There is also a need for a useful cab enclosure for an ATV vehicle. However, attaching a cab to an ATV vehicle involves solving a number of problems, particularly relevant to the ATV industry. One such problem is the use of existing ATV hardware for attaching purposes. It is an object of this invention to provide a useful cab for an ATV vehicle which may be readily attached to standard ATV vehicles by use of the existing racks and hardware on such vehicles.

Another problem peculiar to the ATV cab application is the relative dangerousness of operating an ATV vehicle. While farm tractors and garden tractors normally move at a slow rate of speed, an ATV vehicle may be driven at highway speeds, and often encounters bumps, hills, and sharp turns. Due to the speed and relative danger of operation of an ATV vehicle, a cab which does not obscure the vision of the ATV operator is required. It is another object of this invention to provide a useful cab for an ATV vehicle which does not obscure the vision of the ATV operator while he is driving the vehicle.

Although an ATV vehicle is generally driven by a powerful motor, any attachments to the vehicle such as the instant cab, need to be lightweight and durable. In order to be lightweight and durable, a careful selection of materials and structure is required to facilitate the usefulness of the ATV cab. It is a still further object of this invention to provide a lightweight yet durable cab which is readily attached to the existing hardware of an ATV vehicle.

There are other factors necessary to be considered and solved in the development and attachment of a useful yet safe and durable cab to an ATV vehicle. These other considerations include the type of joints required for the various panels, sealing the panels against inclement weather, and providing a functional closure between the inside of the cab and the inner portion of the ATV vehicle. Other and further objects of this invention will become apparent upon reading the below described Specification.

BRIEF DESCRIPTION OF THE DEVICE

An ATV vehicle generally has four wheels supporting a chassis. The motor, steering mechanism, and seat are located within the four wheel area. An ATV vehicle also generally has a rear cargo rack and a front cargo rack. The instant device is removably attached to the front and rear cargo racks of an ATV vehicle. The device has a clear front windshield, a clear rear windshield, right and left clear sides and a clear top. The front windshield, rear window, sides and top are attached to each other and subsequently attached to the cargo rack of the ATV vehicle. Clear plexiglass is used for the front, rear, sides and top and is connected by means of rigid aluminum sheet or frame angles. The sides extend down to the running boards of the vehicle. Flexible vinyl is permanently attached to the front and rear inner portion of the cab. This vinyl is temporarily attached to the fenders by VELCRO attachments or other suitable attachments. The left side has a pivotable door. The entire device is attached to the cargo racks of an ATV vehicle by means of bolts. The cab not only provides protection from inclement weather such as snow or rain, but also provides heat for the occupant because the inner portion of the cab is essentially sealed about the engine and riding areas.

DETAILED DESCRIPTION OF THE PREFERRED EMBODIMENT

Figure 1:
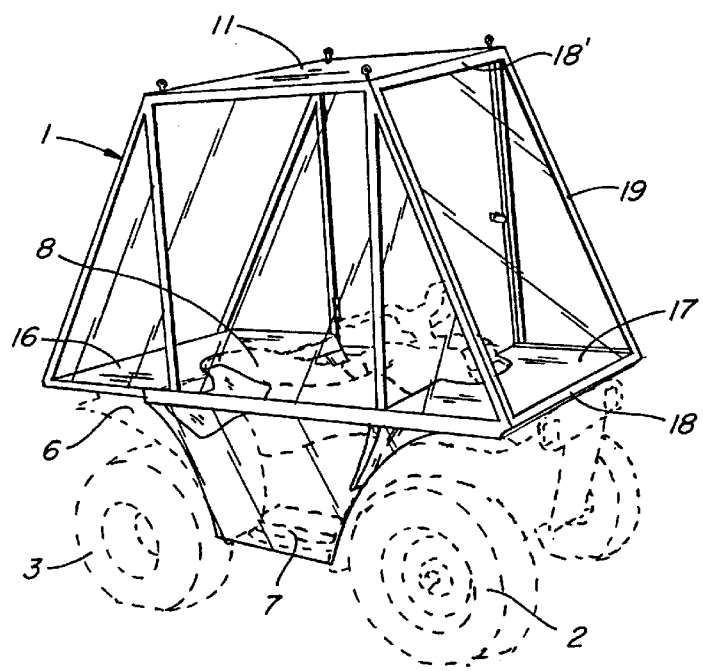
FIG. 1 is a perspective view of the ATV cab shown attached to a vehicle.

An ATV vehicle 1 generally has two front wheels 2 and two rear wheels 3 which support a chassis. The chassis supports the motor, transmission, steering mechanism, gas tank, hood and occupant's seat 8. Also attached to the chassis and covering the front wheels 2 are front fenders 5. Attached to the chassis at the rear and covering the rear wheels 3 are rear fenders 6. In order to support the feet of the occupant of the vehicle are left and right running boards or foot supports 7. Most ATV vehicles also have a front luggage rack 4 attached near the front of the vehicle similar to the rear luggage rack 4'. The seat 8 is centrally located and generally supports the driver, although some seats may be elongated and allow for the seating of the driver plus a rider.

Figure 2:
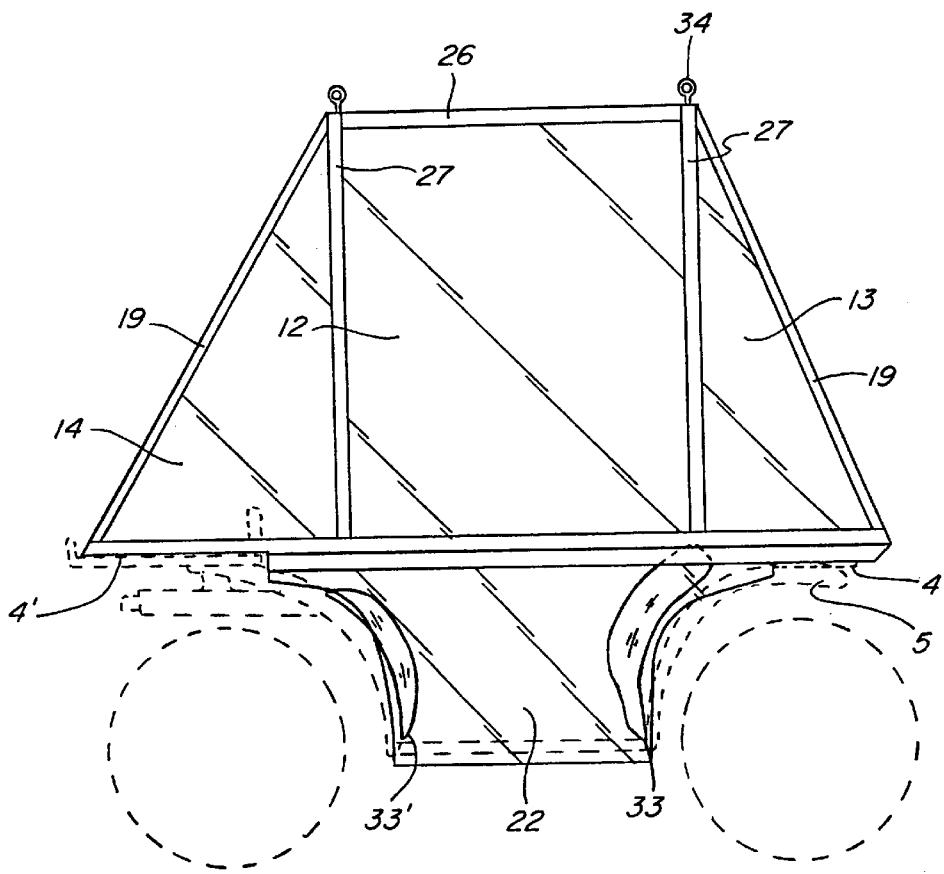
FIG. 2 is a right side view of the ATV cab.

The ATV all-weather enclosure utilizes polycarbonate sheet material for the front, rear, sides, and top. The cab windshield 9, as shown in FIGS. 1 and 2, slopes downwardly and frontwardly as shown. The rear window 10 of the cab slopes downwardly and rearwardly, as shown in the Drawing Figures. The top 11 is parallel to the lower main frame 18, as best shown in FIG. 1. The left and right sides each comprise three separate sections, as shown in the Drawing Figures. Essentially rectangular central side panels 12 are connected to essentially triangular shaped front 13 and rear 14 side panels.

As shown on the right side view Drawing FIG. 2, the right side consists of a right central side panel 12, a right front side panel 13, and a right rear side panel 14. These side panels are connected to each other and connected to the front windshield, rear window and top, by the aluminum main frame angles and the aluminum secondary frame angles. Details of these connections and construction of the cab will be described later.

Figure 3:
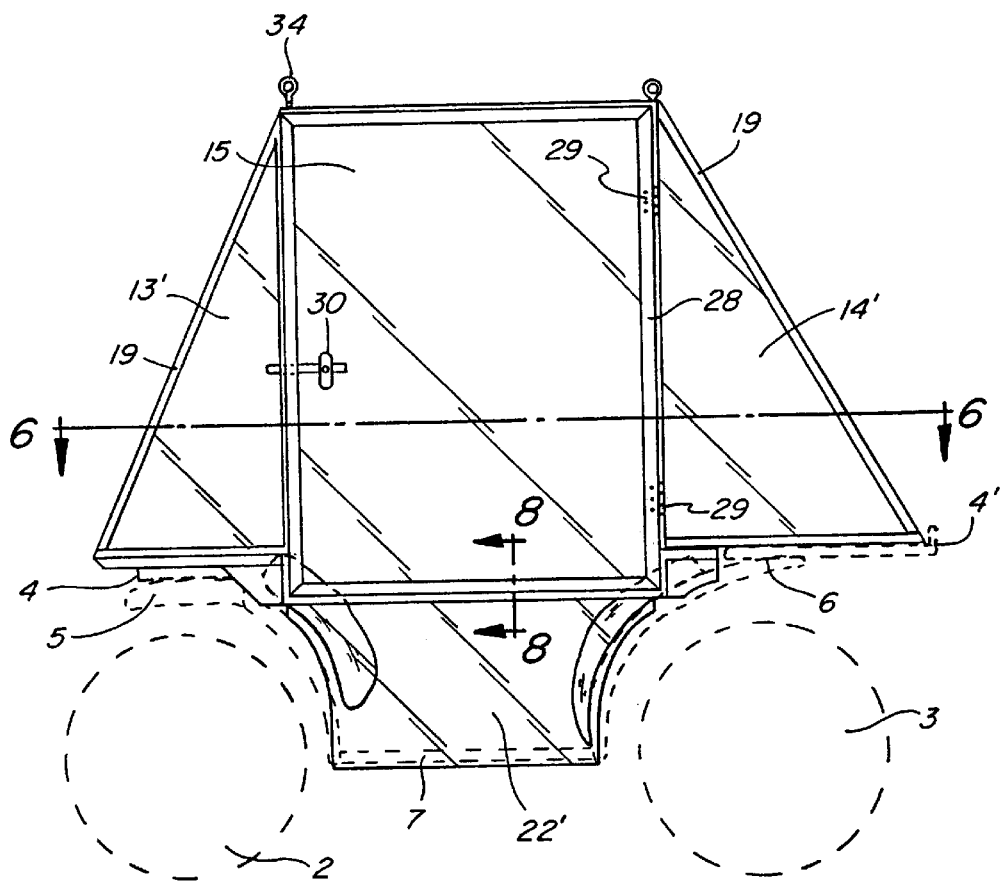
FIG. 3 is a left side view of the ATV cab.

As best shown on FIG. 3, the left side of the cab also includes a door 15. The door 15 is hinged to the vertical main frame, as described further in this Specification. The left side door 15 is also connected to a left front side panel 13' and a left rear side panel 14' by use of the aluminum angles.

The construction of this particular ATV cab also provides for a rear deck 16 and a front deck 17. These decks may be utilized for carrying cargo, tools, or other suitable material.

Due to the configuration of an ATV vehicle, an added lower right panel 22 and a corresponding lower left panel 22' are attached beneath the main frame. These polycarbonate lower panels extend between the front and rear fenders and extend down to the running boards to protect the operator's legs from the elements.

Figure 6:
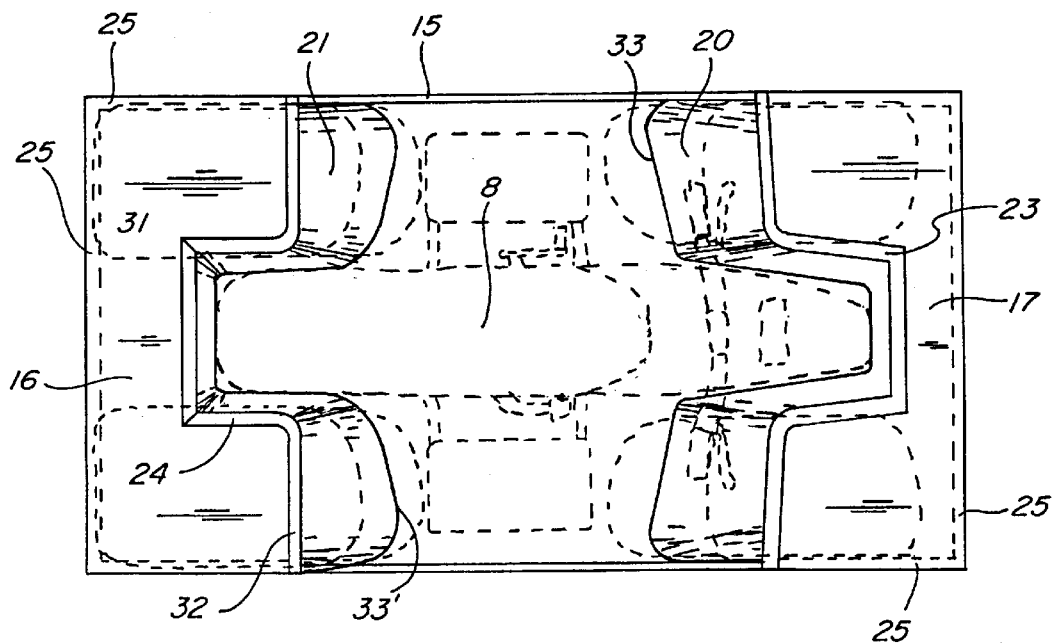
FIG. 6 is a top view of the ATV cab taken along lines 6—6, as shown in FIG. 3.
Figure 5:
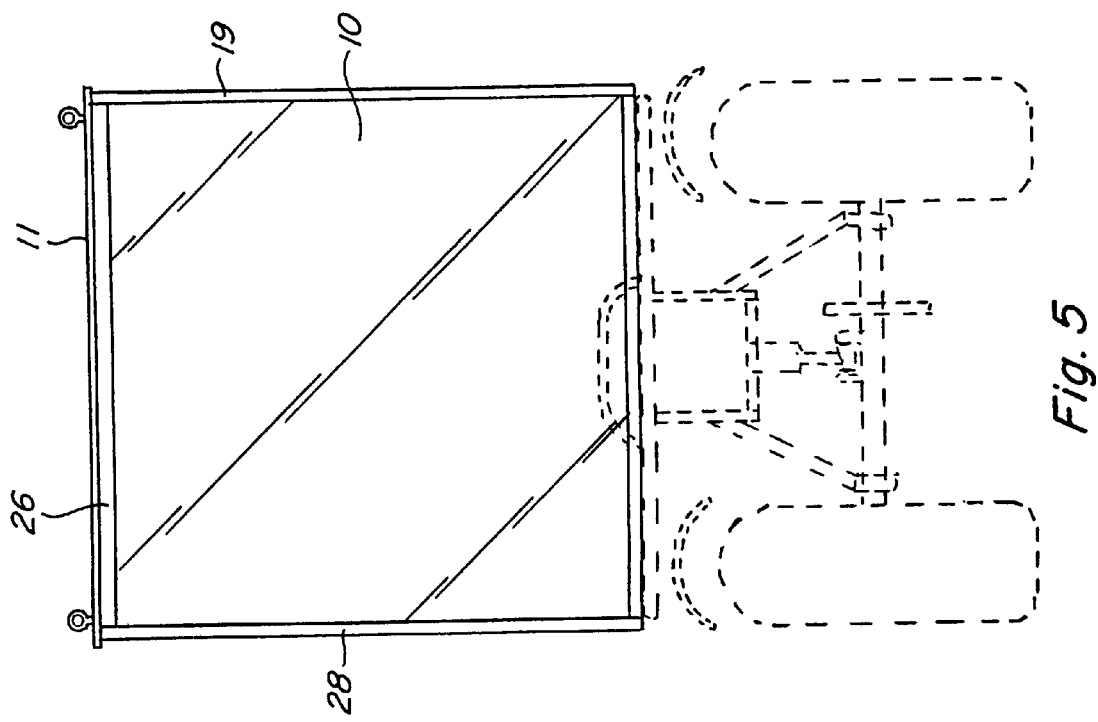
FIG. 5 is a rear view of the ATV cab.

Turning now to FIG. 6, the interior of the vehicle is shown. In order to seal the cab to the vehicle fenders, seat and hood, a flexible vinyl flap system is attached to the inner portion of the vehicle. Turning first to the front of the vehicle, the front deck 17 is attached to the cargo rack 4 by means of bolts. Attached to the inner portion 23 of the front deck 17 is a front flap 20. On Drawing FIG. 6, the inner, lower edge of the front flap 20 is shown at 33. This flap is attached to the inner portion 23 of the front deck 17 and is irregularly shaped as shown in Drawing Figure 6.

The outer lower edge 33 of the front flap 20 is sealed to the fenders by means of VELCRO or other connectors. The flexible vinyl front flap 20 thus seals the cab unit between the front deck 17 and the front fenders, seat and hood inside the vehicle for protection of the occupant from the elements.

A rear flap 21 is also connected in the rear of the vehicle to serve the same purposes as the front flap 20. The rear flap 21 is connected to the inner portion 24 of the rear deck 16 similar to the connection of the front flap. The lower edge 33 of the rear flap is also connected to the rear fenders by VELCRO or other fasteners similar to the connection of the front flap. The front 20 and rear 21 flaps run between the front deck and the rear deck, respectively and reach to the approximate position of the running boards 7. As shown on FIG. 6, these irregularly shaped front and rear flaps lay along the outer circumference of the seat and hood as shown. These flaps provide an effective seal for the occupant of the vehicle from the elements. In addition, they help to contain the heat generated by the vehicle engine and partially heat the enclosure. The flexible vinyl flaps 20 and 21 are permanently attached to the front and rear decks by means of hold down strips 32 and pop rivets.

Figure 4:
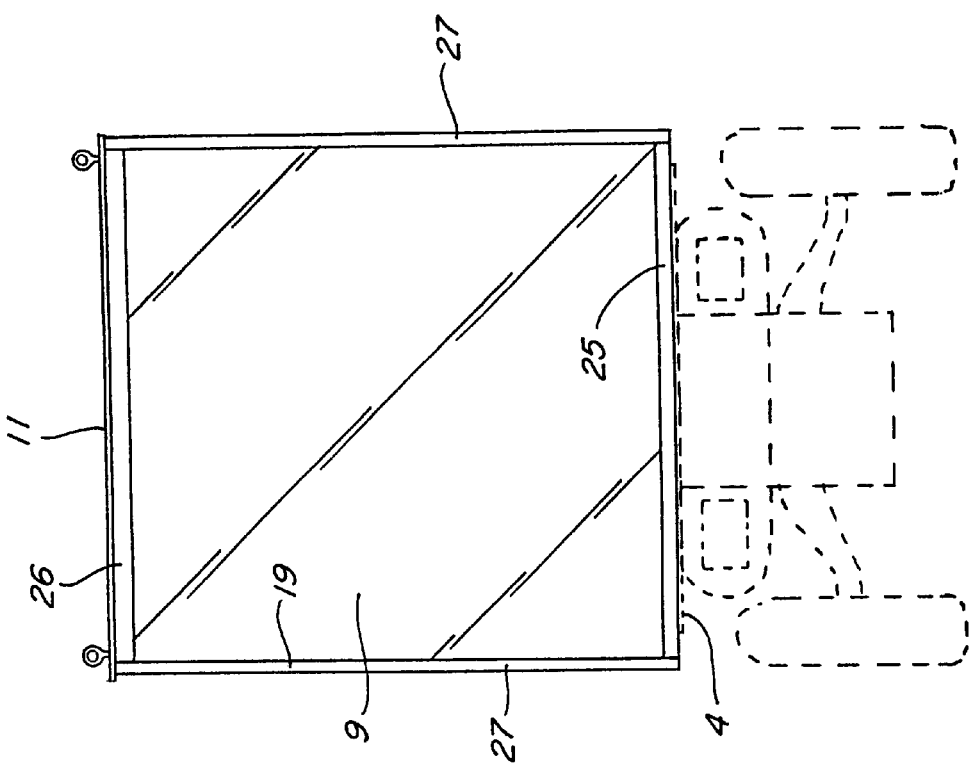
FIG. 4 is a front view of the ATV cab.

The enclosure utilizes an upper 18' and a lower 18 aluminum main frame made with ⅛" thick angles and channels. The main frame consists of three components, a lower rectangular horizontal main frame 25, an upper rectangular horizontal main frame 26 and left and right rectangular vertical main frames 27, as best shown on FIG. 4. The lower rectangular horizontal main frame 25 consists of the outer rectangular edges best shown in FIG. 6. The upper rectangular horizontal main frame 26 supports the top 11.

In order to support the right side panel 12 and the door 15, rectangular vertical main frames 27 are attached to the lower rectangular horizontal main frame 25 and are perpendicular to the lower horizontal main frame. The vertical main frames run between the lower horizontal main frame 25 and the upper horizontal main frame 26. The lower horizontal, upper horizontal and left and right vertical main frames are connected to each other and form the major structure of the main frame.

The lower rectangular horizontal main frame 25 is connected to the front 4 and rear racks 41 of the ATV vehicle through suitable attaching means. The preferred means of attaching the main frame to the cargo racks is by the use of stainless steel carriage bolts and wing nuts. Two stainless steel carriage bolts are placed through the front main frame and the front luggage rack and the frame and luggage rack are then attached by means of the wing nuts. Two stainless steel carriage bolts are also used to attach the rear of the main frame to the rear luggage rack by use of two wing nuts. Ordinarily, one bolt and nut are used on each side of the racks. The unit can be installed or removed by use of these carriage bolts or wing nuts in approximately five minutes.

Attached to the main frame are a number of secondary frame struts 19. These secondary frame struts 19 are connected between the rectangular horizontal main frame 25 and the smaller, upper rectangular main frame 26. Because the upper frame is smaller, the struts 19 are connected at the oblique angle best shown on FIGS. 1, 2, and 3. These secondary frame struts 19 are made with 3/32" aluminum angles.

Figure 7:
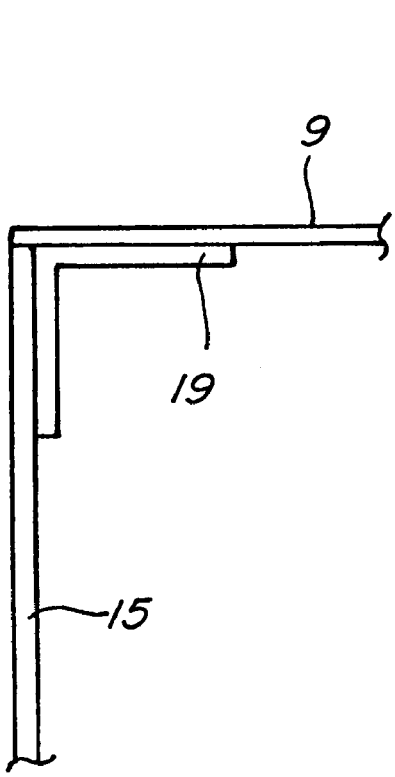
FIG. 7 is a detailed, enlarged view of the upper right corner cutaway view shown in FIG. 6.

The secondary frame struts 19 used to connect the front windshield 9 to the left 15 and right 12 sides is positioned such that one leg of the angle is attached to the inside of the edge of the windshield 9 while the other leg of the angle is attached to the inside of the side. This attachment is shown on FIG. 7. This perpendicular angle 19 is attached to the polycarbonate sheets using 10–32 nylon bolts and nuts. The polycarbonate, in the preferred embodiment is ⅛" thick. A layer of clear silicone caulk is also applied to the seam between the angle surface and the windshield to seal the connection. Similar secondary aluminum angles are attached to the right side edge of the windshield, and the left and right side edges of the rear window. Nylon bolts and nuts are used due to their anti-corrosive effects. Silicone caulk is applied throughout all seams in order to make the cab weather tight. Alternatively, aluminum pop rivets can also be used in the place of the nylon bolts. However, the use of nylon bolts and nuts also facilitate emergency egress.

The top 11 of the cab may be slightly larger than the top frame 26 creating an eave over the sides. This seam is caulked to provide a tight seal.

The cab device is secured to the cargo rack frames by use of ⅛" by 1" aluminum angles. One leg of the aluminum angle is attached to the polycarbonate sheet at the bottom by a 10–32 nylon bolt and nut. The other, perpendicular leg of the aluminum angle may then be attached by drilling a hole through that leg and through the cargo rack and securing the aluminum angle to the cargo rack by use of a ¼" wing nut and bolt, as described as above.

Figure 8:
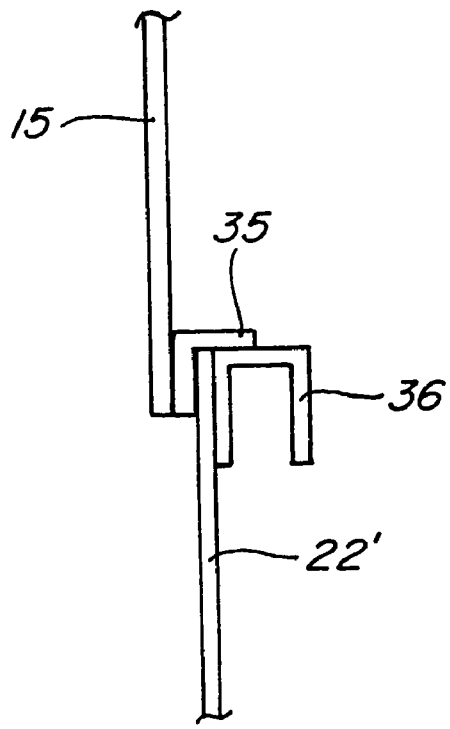
FIG. 8 is a side view of the bottom of the door taken along lines 8—8 of FIG. 3.

The left side door is attached by means of hinges which are located along the rear left main vertical upright 28. The ⅛" polycarbonate sheet is connected to the rear left main vertical upright 28 by means of hinges 29. The bottom edge of the door may have a ³⁄₃₂" by ¾" angle 35 attached thereto by means of nylon bolts and nuts. See FIG. 8. One vertical leg of the aluminum angle would be attached parallel to the polycarbonate door 15, while the perpendicular edge of the aluminum angle would be perpendicular to the door. This perpendicular edge would then rest on a ⅛" by 1" aluminum channel 36 which is attached to the top edge of the lower left panel 22'. Attaching the angle to the bottom of the door and allowing it to rest on the ⅛" by 1" inverted U-shaped aluminum channel 36 allows for greater stability of the door. The door is closed by any standard fastening means. The door has an outer door handle 30 and a corresponding inner door handle. As with most of the joints on this invention, the hinged door edge may be reinforced with an aluminum angle which is then attached to the rear left main vertical upright 28 by means of hinges 29.

Each edge of the top 11 of the cab is attached to the upper rectangular horizontal main frame 26 in a manner similar to that already described. One leg of a ⅛" by 1" aluminum angle is bolted to the top. The other leg of the aluminum angle may then be attached to the side in a suitable fashion. A clear silicone seal is used when making this attachment and the top edge slightly overlaps the side so as to weatherproof the entire cab. On the left top edge adjacent to the door the lower leg of the aluminum angle attached to the top is adapted to be received by the inverted aluminum angle attached to the top of the door. The top of the door has one leg of an aluminum angle attached near the top edge by means of nylon nuts and bolts. The other, bottom, perpendicular, inwardly directed leg of the aluminum angle is adapted to receive the angle attached to the top edge of the roof.

Turning to the right side of the vehicle, the right side front panel 13 is attached to the lower right side panel 22 by means of a ⅛" by 1" aluminum angle and a ⅛" by 1" aluminum channel. The bottom edge of the right side central panel 12 is attached to the lower right side panel 22 by means of angles. The aluminum channels are attached to the polycarbonate sheets by means of flat head aluminum pop rivets. It has been found that utilizing the aluminum angles on all perpendicular edges in conjunction with silicone caulk creates a sturdy yet durable seal.

Figure 9:
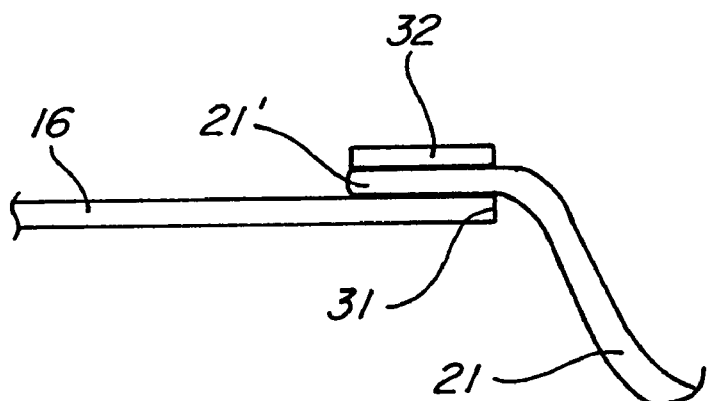
FIG. 9 is a side view of the vinyl flap fastening mechanism.

In order to provide a substantially element proof interior, flexible vinyl flaps are attached to the front and rear inner portions of the cab. As best shown on FIGS. 1, 6 and 9, a rear deck 16 of polycarbonate sheet material or other suitable material is attached to the lower main frame 25 parallel to said lower rectangular horizontal main frame 25. The inner edge 31 of the rear deck 16 is irregularly shaped as shown on FIG. 6. This irregular shape approximates the contours of the seat 8 of the vehicle. The upper portion 21' of the rear flap 21 is attached to the inner edge 31 of the rear deck 16 by means of placing the vinyl on the rear deck and securing a polycarbonate hold-down strip 32 above the vinyl sheet. (This is best shown on FIG. 9.) The polycarbonate hold-down strip 32 is approximately 1" wide and ⅛" thick and runs along the contour of the irregularly shaped inner edge 31 of the rear deck 16. The sandwiched vinyl flap is then secured in place by attaching the upper polycarbonate hold-down strip 32 through the vinyl flap 21 and through the edge 31 of the rear deck by pop rivets.

The other end of the vinyl is also attached to the respective left and right fenders by means of snaps or VELCRO fasteners. The lower edge 33' of the vinyl strip runs approximately to the floorboard 7 on each side of the vehicle as best shown in FIGS. 2 and 3. This lower edge 33' of the vinyl strip thus provides a sufficient seal from the elements to enable the driver of the vehicle to drive in comfort. In addition, this flexible vinyl flap is sufficient to contain much of the heat developed by the engine within the cab.

The front of the cab also has a flexible vinyl front flap 20 attached to the inner edge of the front deck 17 in a similar manner. The lower edge 33 of the front flap 20 is attached to each left and right flap fender by snaps or by the VELCRO fasteners. These front and rear flaps thus create a secondary, flexible fender, attached both to the rear and front desks respectively and to the rear and front fenders to create an essentially warm and rain or snow free area for the operation of the vehicle.

The unit is built with all rust-proof materials, of either aluminum, polycarbonate, stainless steel and has vinyl flaps. When this unit is attached to the ATV vehicle the operator has a virtually unobstructed view in all directions, including the top. Although the unit has a door on the left side for entry and exit, this door may be removed for summer use. The unit can also be equipped with an operable window on the right side for ventilation in the summertime.

The cab unit is attached when the lower rectangular horizontal main frame 25 is attached to the ATV front and rear cargo racks by means of the stainless steel carriage bolts and wing nuts. Four lifting eyelets 34 facilitate this process. Preferably four stainless steel bolts and nuts are used with one bolt and wing nut being positioned near each of the four corners of the lower rectangular horizontal main frame. Attachment of additional ⅛" aluminum sheet or ⅛" aluminum main frame angles can be made at various locations along the cargo racks to facilitate attachment of this particular cab to varying shapes and designs of cargo racks normally found in the ATV industry. Because of the unique method of attachment, this cab may be universally adapted to nearly all ATV vehicles.

The main and secondary frames can be assembled to each other at intersections with corner brackets. Alternatively, they could be overlapped or welded. Corners and joints of the polycarbonate sheets are sealed with silicone sealant.

The cab has a hinged door on the left, but this door could be placed on the right side of the door or an additional door could be attached on the right side to facilitate ingress or egress from both sides.

The unit also has attached to it four lifting eyelets as shown on FIGS. 2 and 3. These lifting eyelets 34 are attached to the main frame and are used to lift the entire cab from the ATV vehicle when desired.

In order to remove the cab from the ATV vehicle, one simply removes the four wing nuts which attach the lower rectangular horizontal main frame to the front and rear cargo racks of the ATV vehicles and lift the entire device from the vehicle by use of the lifting eyelets 34.

The instant device provides an all-weather cab for an ATV vehicle which is easy to attach or remove and which readily protects the vehicle operator from inclement weather. Because the unit utilizes clear polycarbonate for the windshield, rear window, sides and top, the operator of the ATV vehicle has a nearly unobstructed view of his surroundings. In addition, the front and rear decks provide cargo carrying areas. The unique attachment of the vinyl flaps to the front and rear cargo decks, as well as to the fenders, restricts airflow and provides the vehicle operator protection from rain and snow. Because the sides extend to the running boards, the protection of the vehicle driver is nearly complete. In addition, with the door closed and the inner flaps fastened, the heat naturally generated from the engine tends to warm the driving compartment.

The above described Specification is meant as a means of illustration only and not as a limitation. The polycarbonate sheets could be thicker or could be composed of a similar clear, yet flexible, material. The aluminum angles could be placed slightly differently while still keeping within the spirit and disclosure of this invention. The use of caulk for all seams is highly desired but not necessary to the practicing of this device. Aluminum pop rivets and nylon bolts and stainless steels bolts and wing nuts are preferred but other types of fasteners or closures could be utilized.

In the preferred embodiment, the windshield slopes backwardly from the front while the rear window slopes forward. It has been found that this configuration provides a very practical unit. However, the entire structure could take a different geometric form but still be within the keeping and disclosure of this particular device. This unit is made to be universally adaptable to most ATV vehicles with the preferred embodiment being as shown and described. However, variations as to the general shape of the cab, the location of the door and windows, or the method of attaching the lower flaps would still be within the keeping of this invention.

Having fully described my device, I claim:

1. A combination cab and flexible flap seal for an ATV wherein said ATV comprises front and rear fenders and racks, a hood, and a driver's seat and lower running boards, said combination comprising:

(a) a lower, lightweight horizontal essentially rectangular main frame attached to said front and rear racks by means of four bolts and wing nuts;

(b) left and right vertical sides perpendicular and attached to said lower main frame and attached to an essentially rectangular upper horizontal frame, wherein said lower horizontal frame is larger than said upper frame, wherein each side comprises a triangular front and rear panel and a rectangular central side panel;

(c) a front oblique windshield and a rear oblique window attached between said upper and lower horizontal frames and a rectangular top, wherein said top, sides, windshield and window are made of clear polycarbonate material;

(d) left and right lower side panels attached beneath said lower horizontal main frame and between said front and rear fenders which extend down to said running boards;

(e) front and rear cargo decks connected to the front and rear of said lower horizontal main frame, respectively;

(f) front and rear flexible, detachable flaps, wherein the top edge of each flap is connected to the front and rear cargo decks, respectively, and each flap having a lower edge detachably connected to said front and rear fender, respectively, wherein said flaps lay along the outer circumference of said seat and hood;

whereby said cab and flaps provide a substantially element proof interior, and whereby said cab and flaps may be quickly and universally attached to nearly all ATVs by means of said four bolts and wingnuts; and whereby the operator of said combination ATV, cab and flaps has a virtually unobstructed view in all directions.

* * * * *